W. S. WEIR.
HARROW.
No. 180,684. Patented Aug. 1, 1876.
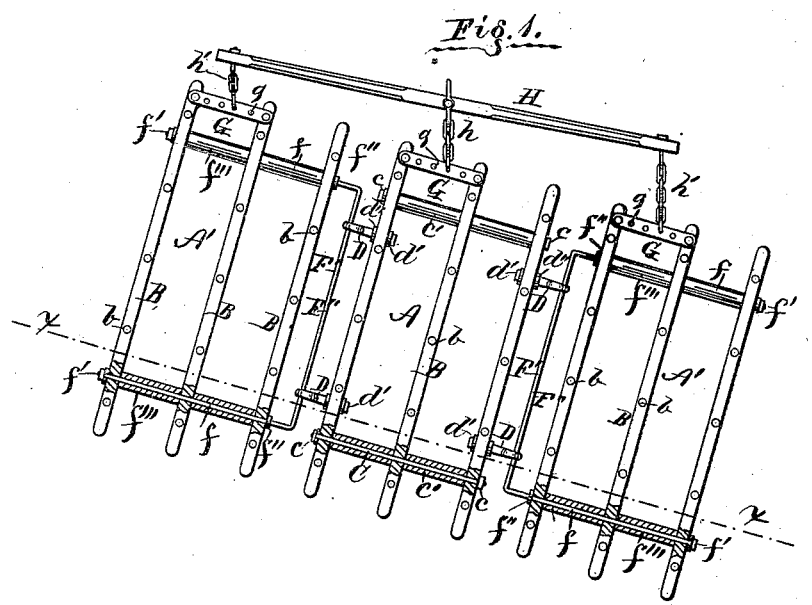
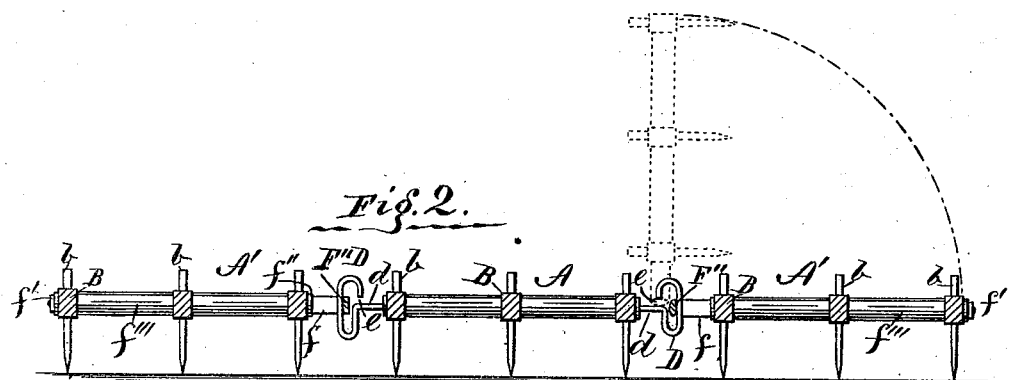
Witnesses:
M. H. Barringer
Chas. Tupper
Inventor:
William S. Weir,
By W. B. Richards,
Atty.

UNITED STATES PATENT OFFICE.

WILLIAM S. WEIR, OF MONMOUTH, ILLINOIS.

IMPROVEMENT IN HARROWS.

Specification forming part of Letters Patent No. 180,684, dated August 1, 1876; application filed May 24, 1876.

*To all whom it may concern:*

Be it known that I, WILLIAM S. WEIR, of Monmouth, in the county of Warren and State of Illinois, have invented certain new and useful Improvements in Harrows; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My improved implement, in its complete form, is of that class of harrows in which three harrow sections or frames are coupled together for joint operation.

My invention relates to said coupling devices; and consists in a peculiar construction, combination, and arrangement of the same, imparting to them, first, strength of pivotal attachment with simplicity of construction; second, adaptation for easy separation or connection of the sections.

In the accompanying drawing, Figure 1 is a top view of a harrow embodying my invention. Fig. 2 is a vertical sectional view in the line $x\ x$ of Fig. 1.

Referring to the parts by letters, A represents the central, and A′ the side sections or harrow-frames. Each section is formed of longitudinal bars B, carrying ordinary harrow-teeth $b$. The bars B in the central section A are united by bolt-rods C, nuts $c$, and spools $c'$, as shown more plainly at the rear end of section A at Fig. 1.

D D are hook-shaped eyes, the shanks $d$ of which are secured in the side bars B of the section A by nuts $d'$ and washers $d''$, and the eyes of which are formed, as shown at Fig. 2, elongated in a vertical direction, and with a small open space, $e$, between the end of the hook D and its shank $d$. F′ is a rod bent to form a central part, F′′, and ends $ff$ at right angles thereto. The length of central part F′′ is somewhat greater than the distance between the eyes D, and the ends $f$ extend through a side section, A′, and are secured therein by nuts $f'$, washers $f''$, and spools $f'''$, and thus hold the rods F′ in place, and also serve as transverse framing-bars to unite the bars B of the side sections A′, as shown plainly at the rear end of Fig. 1, where the spools $f'''$ are shown with their upper halves removed. The part F′′ of the rod F′ is an oblong rectangular bar in its cross-section, as shown by the left-hand one at Fig. 2, or, preferably, of oval bar-iron, as shown by the right-hand one at the same figure. Each harrow-section A A′ has a plate, G, on its forward end and to one side of its center, which is pierced with a series of holes, $g$.

H is the draft-bar, connected by a central chain, $h$, to the central harrow-sections, and, by end chains $h'$, to the side sections, by means of hooks on the chains $h\ h'$, which may be hooked in different holes $g$, for the purpose of regulating the angle of the harrows laterally to the direction of movement in operation—movement of the draft-bar H toward the right-hand side of the harrows bringing the bars B nearer parallel with their paths of motion in the progression of the machine, and conversely.

The sections A′ are united to the sections A by passing the part F′′ of the rod F through the eyes D, and, when so united, it will be evident that either section may have a longitudinal and also a vertical movement independent of the other sections, and that the union is also an axis of flexure in vertical planes between the sections.

For attaching or disconnecting a side from the central section, the side section may be turned up, as shown by dotted lines at Fig. 2, thus bringing the flat bar F′′ into position for passing through the opening $e$, which is made of such size as to pass the bar F′′ its narrow way only, and to prevent its passage when presented its broad side to the opening, as when in use. The construction of the bar F′ is such as to dispense with all bolt and nut connections and with multiplicity of eyebolts.

I am aware that harrows having spools and bolt-rods somewhat like that shown in the center or middle section of my harrow are not new; and I am also aware that sectional harrows have been united by separate rods passing through loops or eyes, and do not, therefore, claim a harrow so constructed.

What I claim as new, and desire to secure by Letters Patent, is—

1. The bar F', having central part F'' and end parts $ff$ extending across the harrow-section, combined with the sections A A' A' and eye-hooks D, substantially as and for the purpose specified.

2. The vertically-arranged eye-hooks D, having small openings $e$, arranged to operate with flat rods F'' and sections A A' A', substantially as described, and for the purpose specified.

In testimony that I claim the foregoing as my own I affix my signature in presence of two witnesses.

WILLIAM S. WEIR.

Witnesses:
WILLIAM B. BOYD,
ALMON KIDDER.